(12) United States Patent
Michelson

(10) Patent No.: US 12,545,503 B2
(45) Date of Patent: Feb. 10, 2026

(54) GARBAGE RECEPTACLE TRANSPORT ASSEMBLY

(71) Applicant: Jeff Michelson, Gillette, NJ (US)

(72) Inventor: Jeff Michelson, Gillette, NJ (US)

( * ) Notice: Subject to any disclaimer, the term of this patent is extended or adjusted under 35 U.S.C. 154(b) by 243 days.

(21) Appl. No.: 18/539,916

(22) Filed: Dec. 14, 2023

(65) Prior Publication Data

US 2025/0197103 A1 Jun. 19, 2025

(51) Int. Cl.
B65F 1/14 (2006.01)

(52) U.S. Cl.
CPC ............ B65F 1/1468 (2013.01); B65F 1/141 (2013.01); *B65F 2210/165* (2013.01)

(58) Field of Classification Search
USPC ..................................................... 198/750.1
See application file for complete search history.

(56) References Cited

U.S. PATENT DOCUMENTS

| 5,042,642 | A | 8/1991 | Ullrich |
| 5,096,049 | A | 3/1992 | Anderson |
| 5,353,887 | A | 10/1994 | Putnam |
| D430,904 | S | 9/2000 | Khalaj |
| 8,146,695 | B1 | 4/2012 | Ramshur |
| 9,908,695 | B1 * | 3/2018 | Thompson ............ B65F 1/1468 |
| 10,625,934 | B2 * | 4/2020 | Mallady ................ B62B 3/0612 |
| 10,934,099 | B2 * | 3/2021 | Wireman ............... B65G 54/02 |
| 10,994,927 | B2 | 5/2021 | Schuster |
| 11,591,158 | B2 * | 2/2023 | Balanon ................ B65G 19/02 |
| 2009/0008888 | A1 | 1/2009 | Boulden |
| 2018/0282059 | A1 | 10/2018 | Balanon |

FOREIGN PATENT DOCUMENTS

WO WO20181293616 7/2018

* cited by examiner

*Primary Examiner* — William R Harp

(57) ABSTRACT

A garbage receptacle transport assembly includes a pair of first rails that is each attachable to each other to define a first track that extends along a driveway of a residence. A pair of second rails is each attachable to each other to define a second track that can be positioned to extend along a driveway of a residence. A support plate is provided which is slidably retained on the first track and the second track. A garbage receptacle can be placed upon the support plate thereby facilitating the support plate to transport the garbage receptacle along the first track and the second track. A drive unit is attached to the support plate which transports the support plate along each of the first track and the second track to transport the garbage receptacle between a curb side for subsequent collection by a garbage collection agency and a home position.

10 Claims, 7 Drawing Sheets

GARBAGE RECEPTACLE TRANSPORT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to garbage transport devices and more particularly pertains to a new garbage transport device for transporting a garbage receptacle between a curb at the end of a driveway and a home position adjacent to a residence. The device includes a pair of tracks and a platform that is positionable on the pair of tracks which supports a garbage receptacle. A drive unit is attached to the platform which includes a drive gear that engages teeth on a respective one of the tracks for urging the platform along the tracks. The device includes a communication unit that is in remote communication with a personal electronic device for remotely controlling the drive unit.

(2) Description of Related Art Including Information Disclosed Under 37 CFR 1.97 and 1.98

The prior art relates to garbage transport devices including a variety of garbage receptacle transport devices that each at least includes a track and a cart disposed on the track for supporting a garbage receptable and at least one powered wheel for urging the cart to travel along the track. In no instance does the prior art disclose a garbage receptacle transport device that includes a plurality of rails that are attachable together to form a pair of tracks and a platform position on the tracks and a drive gear attached to the platform which engages teeth on a respective one of the tracks for urging the platform along the pair of tracks.

BRIEF SUMMARY OF THE INVENTION

An embodiment of the disclosure meets the needs presented above by generally comprising a pair of first rails that is each attachable to each other to define a first track that extends along a driveway of a residence. A pair of second rails is each attachable to each other to define a second track that can be positioned to extend along a driveway of a residence. A support plate is provided which is slidably retained on the first track and the second track. A garbage receptacle can be placed upon the support plate thereby facilitating the support plate to transport the garbage receptacle along the first track and the second track. A drive unit is attached to the support plate which transports the support plate along each of the first track and the second track to transport the garbage receptacle between a curb side for subsequent collection by a garbage collection agency and a home position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
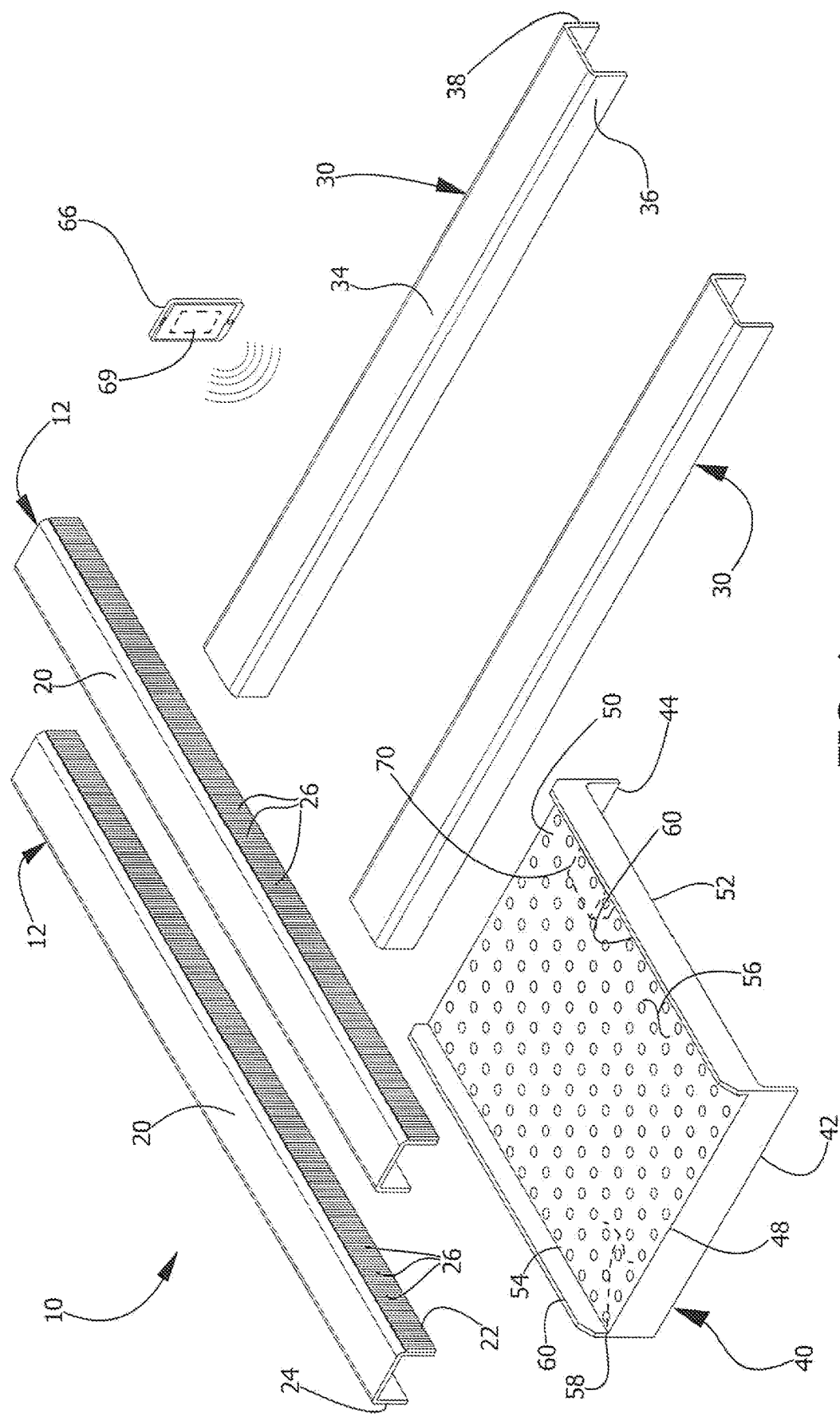
FIG. 1 is a perspective view of a garbage receptacle transport assembly according to an embodiment of the disclosure.
Figure 2:
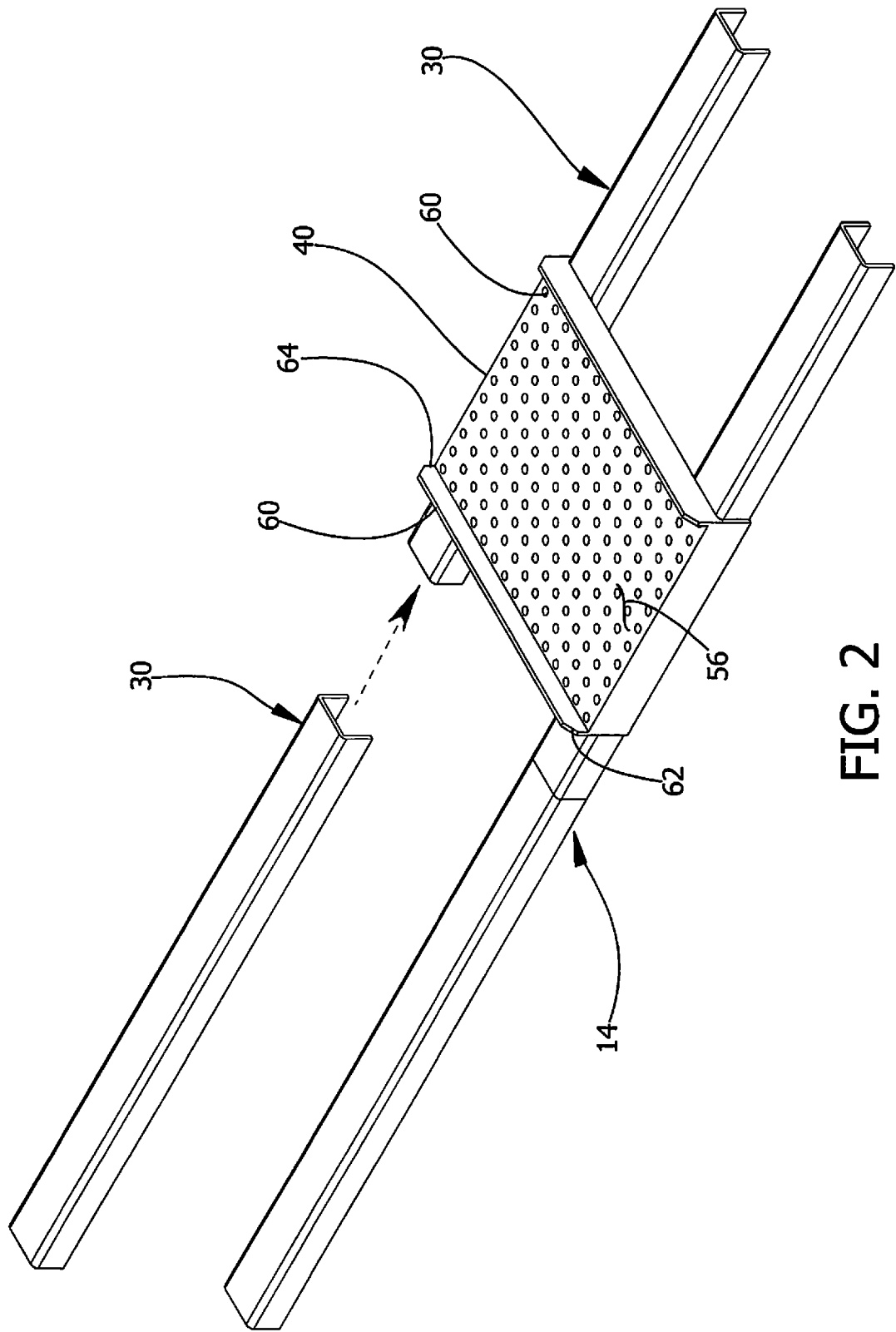
FIG. 2 is an exploded perspective view of an embodiment of the disclosure.
Figure 3:
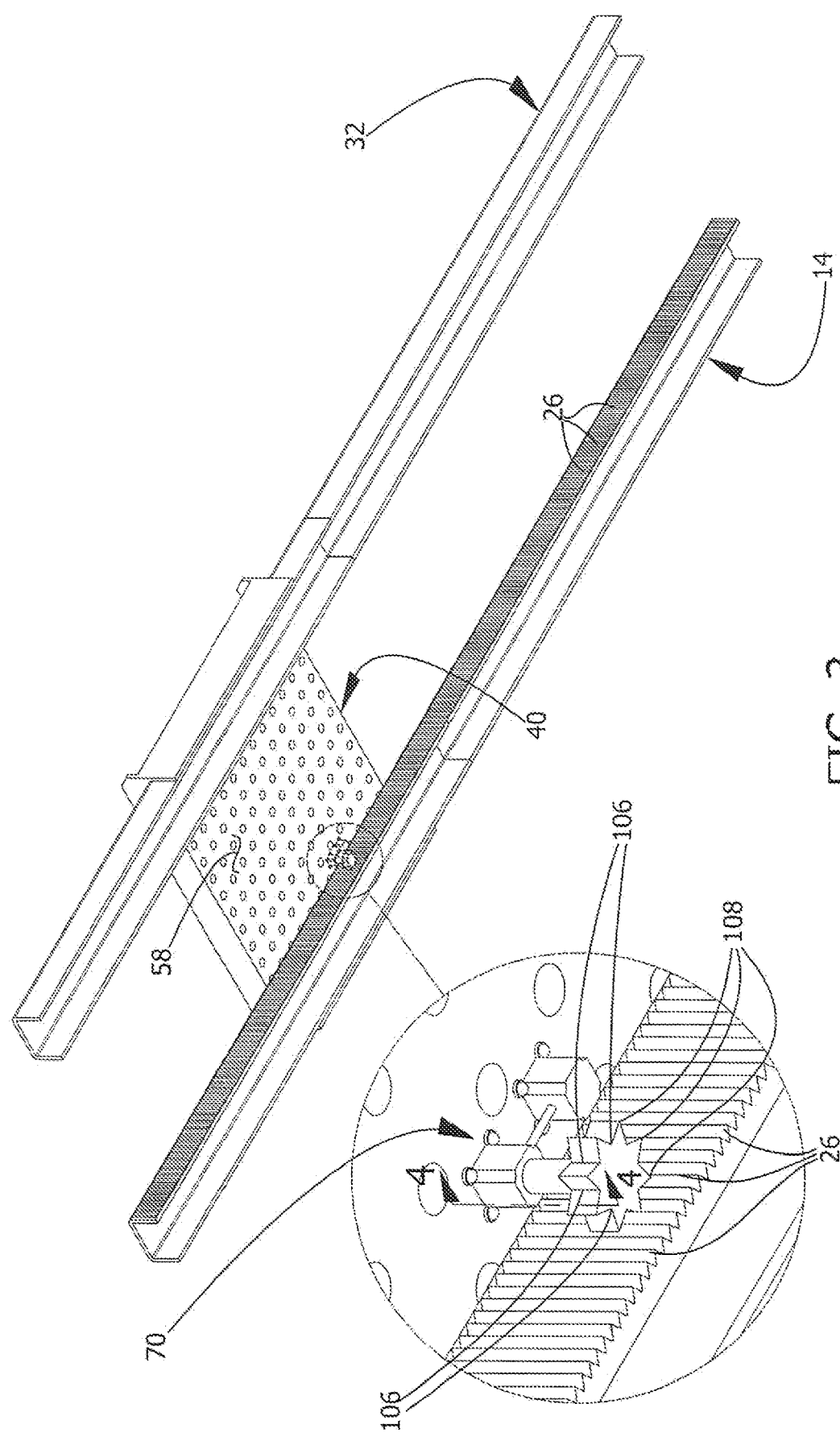
FIG. 3 is a bottom perspective view of an embodiment of the disclosure.
Figure 4:
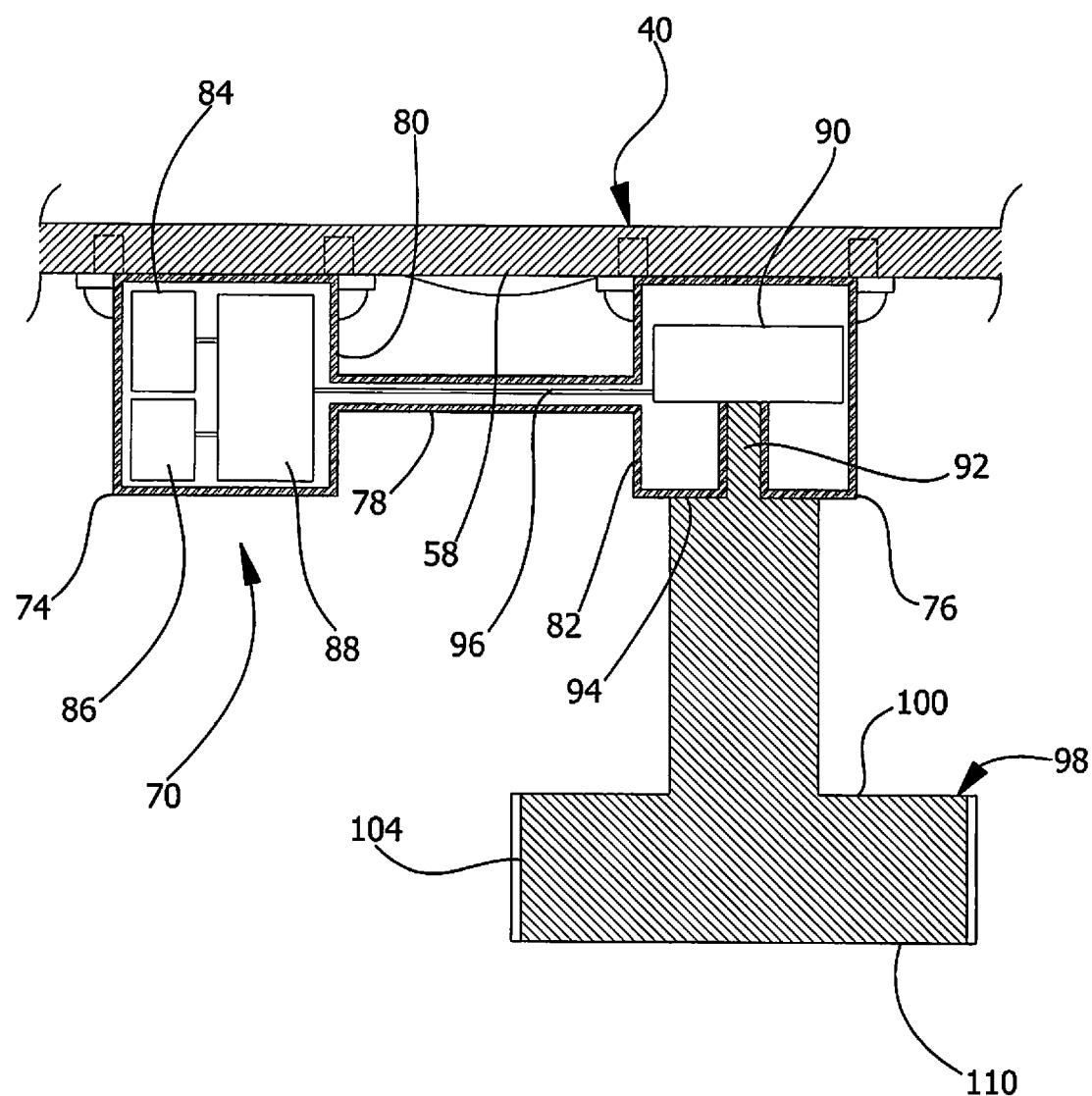
FIG. 4 is a cross sectional view taken along line 4-4 of FIG. 3 of an embodiment of the disclosure.
Figure 5:
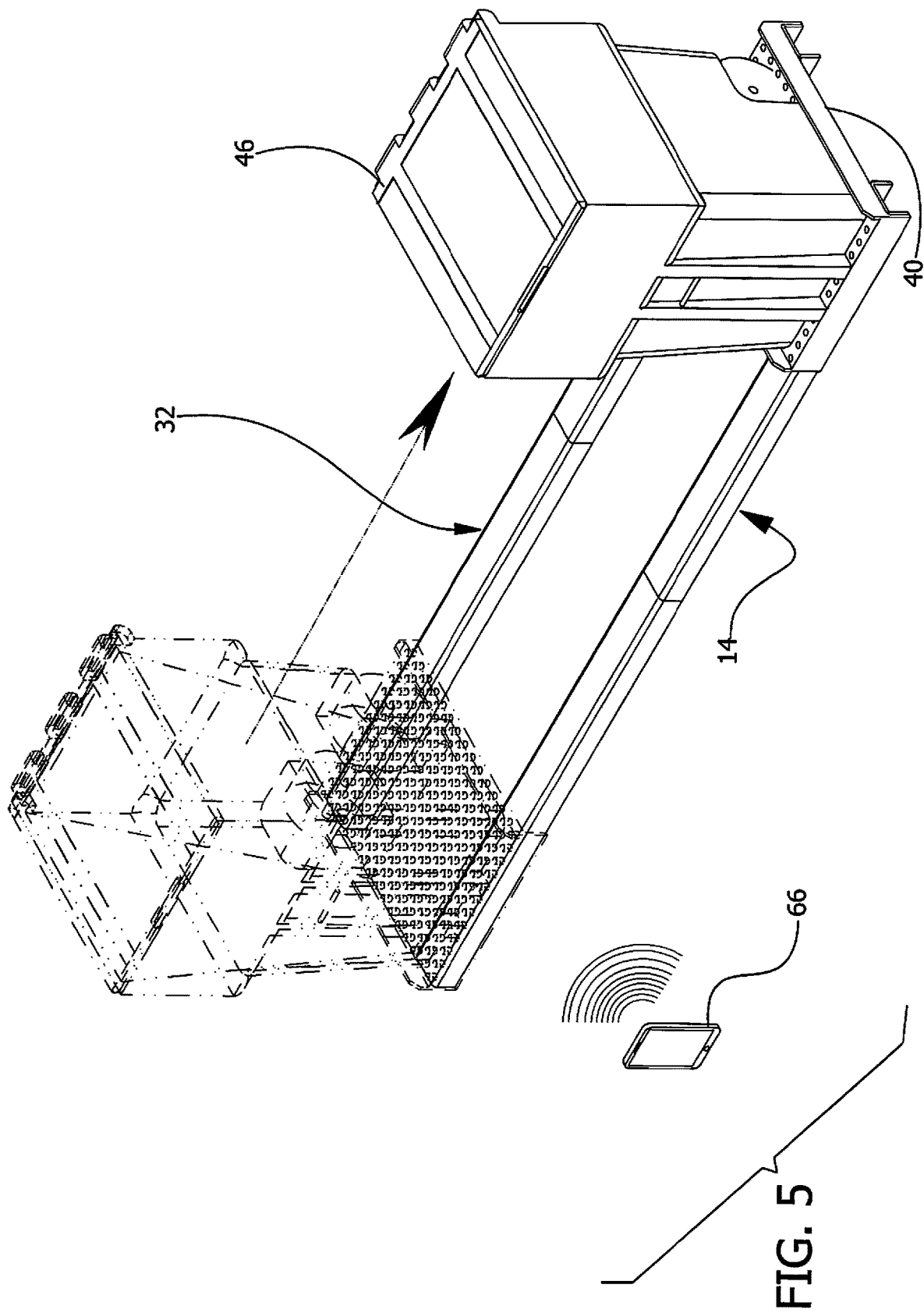
FIG. 5 is a top perspective view of an embodiment of the disclosure.
Figure 6:
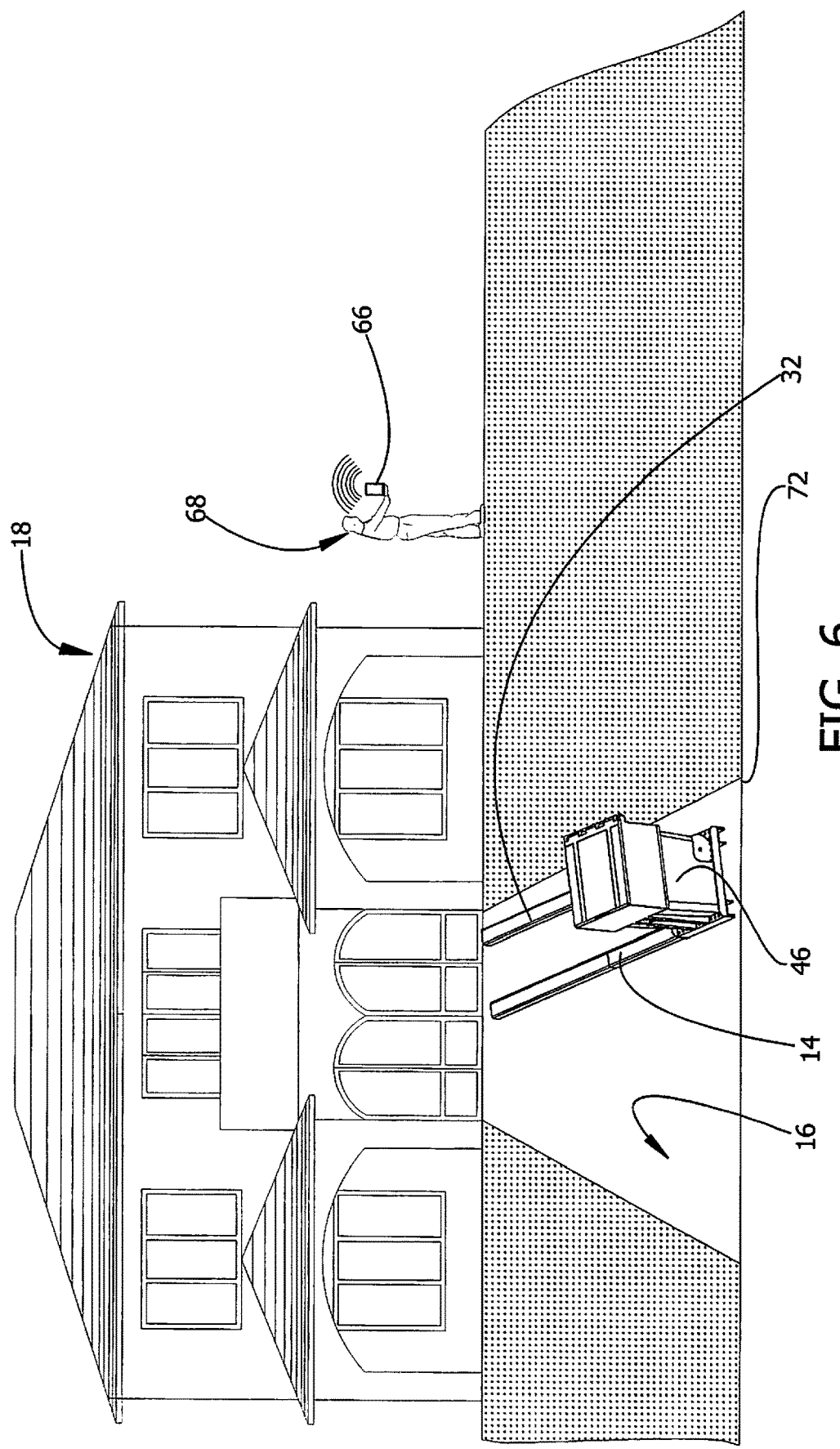
FIG. 6 is a perspective in-use view of an embodiment of the disclosure.
Figure 7:
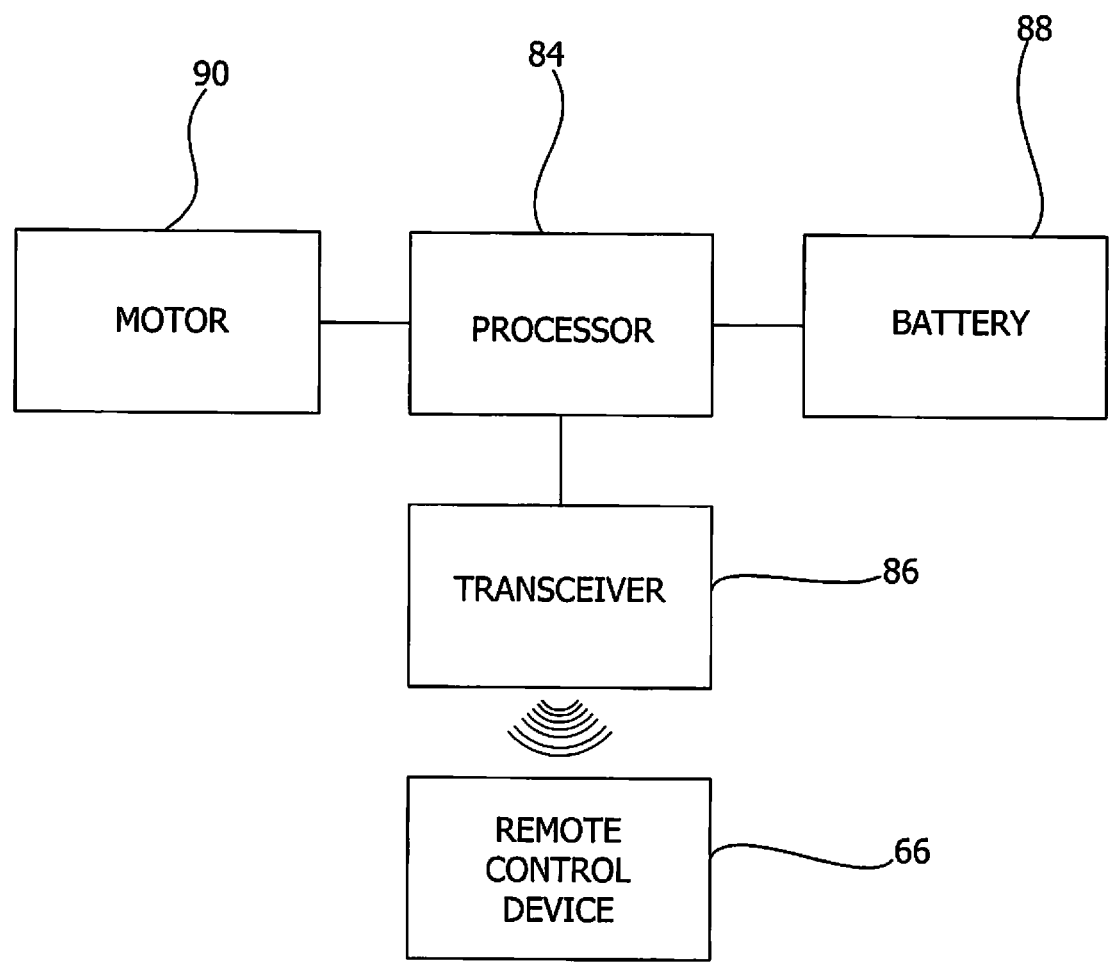
FIG. 7 is a schematic view of an embodiment of the disclosure.

With reference now to the drawings, and in particular to FIGS. 1 through 7 thereof, a new garbage transport device embodying the principles and concepts of an embodiment of the disclosure and generally designated by the reference numeral 10 will be described.

As best illustrated in FIGS. 1 through 7, the garbage receptacle transport assembly 10 generally comprises a pair of first rails 12 that is each attachable to each other end to end such that each of the pair of first rails 12 defines a first track 14. The first track 14 is positioned to extend along a driveway 16 of a residence 18, such as a house for example. Each of the pair of first rails 12 has a top wall 20 extending between a first outer wall 22 and a second outer wall 24 having the first outer wall 22 being spaced from and being oriented parallel to the second outer wall 24 such that each of the pair of first rails 12 has a U-shape. The first outer wall 22 of each of the pair of first rails 12 has a plurality of teeth 26 extending between the top wall 20 and a bottom edge 28 of the first outer wall 22. The teeth 26 are evenly spaced apart from each other and are distributed along a full length of the first outer wall 22.

A pair of second rails 30 is provided and each of the second rails 30 is attachable to each other end to end such that each of the pair of second rails 30 defines a second track 32. The second track 32 can be positioned to extend along the driveway 16 of the residence 18. Additionally, the second track 32 is positionable to be spaced from and be oriented parallel to the first track 14 having the plurality of teeth 26 on each of the first rails 12 being directed toward the second track 32. Each of the pair of second rails 30 has an upper wall 34 extending between a primary outer wall 36 and a secondary outer wall 38 having the primary outer wall 36 being spaced from and being oriented parallel to the secondary outer wall 38 such that each of the pair of second rails 30 has a U-shape. Additionally, each of the pair of first rails 12 and each of the pair of second rails 30 may have a length ranging between approximately 3.0 meters and 6.0 meters.

A support plate 40 is provided which has a first foot 42 and a second foot 44 each extending downwardly from the support plate 40. The support plate 40 is positionable on top of the first track 14 and the second track 32 having each of the first foot 42 and the second foot 44 abutting a respective one of the first track 14 and the second track 32. In this way the support plate 40 is slidably retained on the first track 14 and the second track 32. A garbage receptacle 46 can be placed upon the support plate 40 thereby facilitating the support plate 40 to transport the garbage receptacle 46 along the first track 14 and the second track 32. Furthermore, the support plate 40 is foraminous to pass fluid, such as rain for example, through the support plate 40.

The support plate 40 has a first lateral edge 48, a second lateral edge 50, a front edge 52, a back edge 54, a top surface 56 and a bottom surface 58. Each of the first foot 42 and the second foot 44 extend downwardly from the bottom surface 58 and each of the first foot 42 and the second foot 44 is coextensively aligned with a respective one of the first lateral edge 48 and the second lateral edge 50. The support plate 40 has a pair of lips 60 each extending upwardly from the top surface 56. Each of the pair of lips 60 is coextensively aligned with a respective one of the front edge 52 and the back edge 54 to restrain the garbage receptacle 46 on the top surface 56 of the support plate 40.

The bottom surface 58 of the support plate 40 rests upon the top wall 20 of a respective one of the pair of first rails 12 and the upper wall 34 of a respective one of the pair of second rails 30. The first foot 42 abuts the second outer wall 24 of the pair of first rails 12 when the support plate 40 is positioned on the first track 14. Additionally, the second foot 44 abuts the secondary outer wall 38 of the pair of second rails 30 when the support plate 40 is positioned on the second track 32. Each of the pair of lips 60 is chamfered at each of a first end 62 and a second end 64 of the pair of lips 60. A personal electronic device 66 is provided that is carried by a user 68. The personal electronic device 66 stores digital data comprising a control application 69. The personal electronic device 66 may comprise a smartphone or other similar type of device that has wireless communication capabilities and digital data storage capabilities.

A drive unit 70 is attached to the support plate 40 and the drive unit 70 engages the first track 14 when the support plate 40 is positioned upon the first track 14. The drive unit 70 is in remote communication with the personal electronic device 66 such that the personal electronic device 66 remotely controls the drive unit 70. The drive unit 70 transports the support plate 40 in a first direction along each of the first track 14 and the second track 32 when the drive unit 70 is actuated into a delivering condition. In this way the drive unit 70 can transport the garbage receptacle 46 to a curb 72 for subsequent collection by a garbage collection agency. The drive unit 70 transports the support plate 40 in a second direction along each of the first track 14 and the second track 32 when the drive unit 70 is actuated into a returning condition. In this way the drive unit 70 can transport the garbage receptacle 46 to a home position thereby facilitating an occupant of the residence 18 to place garbage in the garbage receptacle 46.

The drive unit 70 comprises a circuit housing 74 is attached to the bottom surface 58 of the support plate 40 and the circuit housing 74 is positioned closer to the first foot 42 than the second foot 44. The drive unit 70 includes a motor housing 76 that is attached to the bottom surface 58 of the support plate 40. The motor housing 76 is spaced from the circuit housing 74 such that each of the circuit housing 74 and the motor housing 76 are positioned on a line extending between the front edge 52 and the back edge 54 of the support plate 40. The drive unit 70 includes a conduit 78 that is coupled between a first lateral wall 80 of the circuit housing 74 and a first lateral wall 82 of the motor housing 76.

The drive unit 70 includes a processor 84 that is positioned within the circuit housing 74. The processor 84 receives a deliver input and the processor 84 receives a return input. The drive unit 70 includes a transceiver 86 that is positioned within the circuit housing 74 and the transceiver 86 is electrically coupled to the processor 84. The transceiver 86 is in wireless communication with the personal electronic device 66 such that the transceiver 86 receives operational commands from the control application 69 stored in the personal electronic device 66. The processor 84 receives the deliver input when the transceiver 86 receives a deliver command from the control application 69. Furthermore, the processor 84 receives the return input when the transceiver 86 receivers a return command from the control application 69. The transceiver 86 may comprise a radio frequency transceiver or the like and the transceiver 86 may employ Bluetooth communication protocols.

The drive unit 70 includes a power supply 88 that is positioned within the circuit housing 74. The power supply 88 is electrically coupled to the processor 84 and the power supply 88 comprises at least one battery. The drive unit 70 includes a motor 90 that is positioned within the motor housing 76. The motor 90 rotates in a first direction or a second direction when the motor 90 is turned on. Additionally, the motor 90 has an output shaft 92 that extends through a bottom wall 94 of the motor housing 76. The motor 90 may comprise a two direction electric motor or the like.

The drive unit 70 includes a conductor 96 which extends through the conduit 78 such that the conductor 96 extends into the circuit housing 74 and the motor housing 76. The conductor 96 is electrically coupled between the processor 84 and the motor 90 and the conductor 96 is comprised of an electrically conductive material, such as shielded copper wire for example. The motor 90 is turned on to rotate in the first direction when the processor 84 receives the deliver input and the motor 90 is turned on to rotate in the second direction when the processor 84 receives the return input.

The drive unit 70 includes a gear 98 that has an upper surface 100 which is attached to a distal end 102 of the output shaft 92 of the motor 90. The gear 98 has an outer surface 104 which comprises a repeating series of depressions 106 which are evenly spaced apart from each other and distributed around a full circumference of the outer surface 104 to define a plurality of teeth 108 extending between the upper surface 100 of the gear 98 and a lower surface 110 of the gear 98. The teeth 26 on the outer surface 104 enmesh with the teeth 26 on each of the pair of first rails 12 when the motor 90 rotates in either the first direction or the second direction thereby urging the support plate 40 to travel along the first track 14 and the second track 32.

In use, each of the pair of first rails 12 are installed on the driveway 16 such that each of the first outer wall 22 and the second outer wall 24 rest on the driveway 16 having each of the pair of first rails 12 oriented end to end such that the pair of first rails 12 defines the first track 14. Furthermore, the first track 14 is oriented to extend along a length driveway 16 to terminate at the curb 72 at the end of the driveway 16. Each of the pair of second rails 30 are installed on the driveway 16 such that each of the primary outer wall 36 and the secondary outer wall 38 rest on the driveway 16 having each of the pair of second rails 30 oriented end to end such that the pair of second rails 30 defines the second track 32. Furthermore, the second track 32 is oriented to extend along a length driveway 16 to terminate at the curb 72 at the end of the driveway 16 having the second track 32 being oriented parallel to the first track 14. The support plate 40 is positioned on top of each of the first track 14 and the second track 32 and the garbage receptacle 46 is placed on top of the support plate 40.

The control application 69 is manipulated to broadcast the deliver command to the drive unit 70. The drive unit 70 is actuated into the delivering condition thereby transporting the support plate 40 along the first track 14 and the second track 32 until the garbage receptacle 46 is positioned adjacent to the curb 72 at the end of the driveway 16. In this way the garbage receptacle 46 is accessible to the garbage collection agency. The control application 69 is manipulated to broadcast the return command to the drive unit 70 when the garbage collection agency has emptied the garbage receptacle 46. The support plate 40 is transported along the first track 14 and the second track 32 until the garbage receptacle 46 is positioned adjacent to the residence 18. In this way the garbage receptacle 46 is accessible to the user 68 to place garbage in the garbage receptacle 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A garbage receptacle transport assembly for transporting a garbage receptacle along a driveway for subsequent collection by a garbage collection agency, said assembly comprising:

a pair of first rails, each of said first rails being attachable to each other end to end such that each of said pair of first rails defines a first track wherein said first track is configured to be positioned to extend along a driveway of a residence;

a pair of second rails, each of said second rails being attachable to each other end to end such that each of said pair of second rails defines a second track wherein said second track is configured to be positioned to extend along a driveway of a residence;

a support plate having a first foot and a second foot each extending downwardly from said support plate, said support plate being positionable on top of said first track and said second track having each of said first foot and said second foot abutting a respective one of said first track and said second track thereby slidably retaining said support plate on said first track and said second track wherein said support plate is configured to have a garbage receptacle being placed upon said support plate thereby facilitating said support plate to transport the garbage receptacle along said first track and said second track, support plate being foraminous wherein said support plate is configured to pass fluid through said support plate;

a personal electronic device being configured to be carried by a user; and a drive unit being attached to said support plate, said drive unit engaging said first track when said support plate is positioned upon said first track, said drive unit being in remote communication with said personal electronic device such that said personal electronic device remotely controls said drive unit, said drive unit transporting said support plate in a first direction along each of said first track and said second track when said drive unit is actuated into a delivering condition wherein said drive unit is configured to transport the garbage receptacle to a curb side for subsequent collection by a garbage collection agency, said drive unit transporting said support plate in a second direction along each of said first track and said second track when said drive unit is actuated into a returning condition wherein said drive unit is configured to transport the garbage receptacle to a home position thereby facilitating an occupant of the residence to place garbage in the garbage receptacle.

2. The assembly according to claim 1, wherein:

each of said pair of first rails has a top wall extending between a first outer wall and a second outer wall having said first outer wall being spaced from and being oriented parallel to said second outer wall such that each of said pair of first rails has a U-shape;

said first outer wall of each of said pair of first rails has a plurality of teeth extending between said top wall and a bottom edge of said first outer wall;

said plurality of teeth is evenly spaced apart from each other and is distributed along a full length of said first outer wall; and each of said pair of second rails has an upper wall extending between a primary outer wall and a secondary outer wall having said primary outer wall being spaced from and being oriented parallel to said secondary outer wall such that each of said pair of second rails has a U-shape.

3. The assembly according to claim 2, wherein said second track is positionable to be spaced from and be oriented parallel to said first track having said plurality of teeth on each of said first rails being directed toward said second track.

4. The assembly according to claim 1, wherein:
said support plate has a first lateral edge and a second lateral edge and a front edge and a back edge and a top surface and a bottom surface;
each of said first foot and said second foot extends downwardly from said bottom surface having each of said first foot and said second foot being coextensively aligned with a respective one of said first lateral edge and said second lateral edge;
said support plate has a pair of lips each extending upwardly from said top surface; and
each of said pair of lips is coextensively aligned with a respective one of said front edge and said back edge wherein each of said pair of lips is configured to restrain the garbage receptacle on said top surface of said support plate; and
each of said pair of lips is chamfered at each of a first end and a second end of said pair of lips.

5. The assembly according to claim 4, wherein:
each of said pair of first rails has a top wall and a first outer wall and a second outer wall;
each of said second rails has an upper wall and a primary outer wall and a secondary outer wall;
said bottom surface of said support plate rests upon said top wall of a respective one of said pair of first rails and said upper wall of a respective one of said pair of second rails;
said first foot abuts said second outer wall of said pair of first rails when said support plate is positioned on said first track; and
said second foot abuts said secondary outer wall of said pair of second rails when said support plate is positioned on said second track.

6. The assembly according to claim 4, wherein said drive unit comprises:
a circuit housing being attached to said bottom surface of said support plate, said circuit housing being positioned closer to said first foot than said second foot;
a motor housing being attached to said bottom surface of said support plate, said motor housing being spaced from said circuit housing such that each of said circuit housing and said motor housing are positioned on a line extending between said front edge and said back edge of said support plate; and
a conduit being coupled between a first lateral wall of said circuit housing and a first lateral wall of said motor housing.

7. The assembly according to claim 6, wherein:
said personal electronic device stores digital data comprising a control application; and
said drive unit includes:
a processor being positioned within said circuit housing, said processor receiving a deliver input, said processor receiving a return input;
a transceiver being positioned within said circuit housing, said transceiver being electrically coupled to said processor, said transceiver being in wireless communication with said personal electronic device such that said transceiver receives operational commands from said control application stored in said personal electronic device;
said processor receives said deliver input when said transceiver receives a deliver command from said control application;
said processor receives said return input when said transceiver receivers a return command from said control application; and
a power supply being positioned within said circuit housing, said power supply being electrically coupled to said processor, said power supply comprising at least one battery.

8. The assembly according to claim 7, wherein said drive unit includes:
a motor being positioned within said motor housing, said motor rotating in a first direction or a second direction when said motor is turned on, said motor having an output shaft extending through a bottom wall of said motor housing; and
a conductor extending through said conduit such that said conductor extends into said circuit housing and said motor housing, said conductor being electrically coupled between said processor and said motor, said motor being turned on to rotate in said first direction when said processor receives said deliver input, said motor being turned on to rotate in said second direction when said processor receives said return input.

9. The assembly according to claim 8, wherein:
each of said pair of first rails has a plurality of teeth being integrated into said first rails;
said drive unit includes a gear having an upper surface being attached to a distal end of said output shaft of said motor;
said gear has an outer surface comprising a repeating series of depressions which are evenly spaced apart from each other and distributed around a full circumference of said outer surface to define a plurality of teeth extending between said upper surface of said gear and a lower surface of said gear; and
said teeth on said outer surface enmesh with said teeth on each of said pair of first rails when said motor rotates in either said first direction or said second direction thereby urging said support plate to travel along said first track and said second track.

10. A garbage receptacle transport assembly for transporting a garbage receptacle along a driveway for subsequent collection by a garbage collection agency, said assembly comprising:
a pair of first rails, each of said first rails being attachable to each other end to end such that each of said pair of first rails defines a first track wherein said first track is configured to be positioned to extend along a driveway of a residence, each of said pair of first rails having a top wall extending between a first outer wall and a second outer wall having said first outer wall being spaced from and being oriented parallel to said second outer wall such that each of said pair of first rails has a U-shape, said first outer wall of each of said pair of first rails having a plurality of teeth extending between said top wall and a bottom edge of said first outer wall, said plurality of teeth being evenly spaced apart from each other and being distributed along a full length of said first outer wall;
a pair of second rails, each of said second rails being attachable to each other end to end such that each of said pair of second rails defines a second track wherein said second track is configured to be positioned to extend along a driveway of a residence, said second track being positionable to be spaced from and be oriented parallel to said first track having said plurality of teeth on each of said first rails being directed toward said second track, each of said pair of second rails having an upper wall extending between a primary outer wall and a secondary outer wall having said primary outer wall being spaced from and being oriented parallel to said secondary outer wall such that each of said pair of second rails has a U-shape;

a support plate having a first foot and a second foot each extending downwardly from said support plate, said support plate being positionable on top of said first track and said second track having each of said first foot and said second foot abutting a respective one of said first rails and said second rails thereby slidably retaining said support plate on said first track and said second track wherein said support plate is configured to have a garbage receptacle being placed upon said support plate thereby facilitating said support plate to transport the garbage receptacle along said first track and said second track, support plate being foraminous wherein said support plate is configured to pass fluid through said support plate, said support plate having a first lateral edge and a second lateral edge and a front edge and a back edge and a top surface and a bottom surface, each of said first foot and said second foot extending downwardly from said bottom surface having each of said first foot and said second foot being coextensively aligned with a respective one of said first lateral edge and said second lateral edge, said support plate having a pair of lips each extending upwardly from said top surface, each of said pair of lips being coextensively aligned with a respective one of said front edge and said back edge wherein each of said pair of lips is configured to restrain the garbage receptacle on said top surface of said support plate, said bottom surface of said support plate resting upon said top wall of a respective one of said pair of first tracks and said upper wall of a respective one of said pair of second tracks, said first foot abutting said second outer wall of said pair of first rails when said support plate is positioned on said first track, said second foot abutting said secondary outer wall of said pair of second rails when said support plate is positioned on said second track, each of said pair of lips is chamfered at each of a first end and a second end of said pair of lips;

a personal electronic device being configured to be carried by a user, said personal electronic device storing digital data comprising a control application; and a drive unit being attached to said support plate, said drive unit engaging said first track when said support plate is positioned upon said first track, said drive unit being in remote communication with said personal electronic device such that said personal electronic device remotely controls said drive unit, said drive unit transporting said support plate in a first direction along each of said first track and said second track when said drive unit is actuated into a delivering condition wherein said drive unit is configured to transport the garbage receptacle to a curb side for subsequent collection by a garbage collection agency, said drive unit transporting said support plate in a second direction along each of said first track and said second track when said drive unit is actuated into a returning condition wherein said drive unit is configured to transport the garbage receptacle to a home position thereby facilitating an occupant of the residence to place garbage in the garbage receptacle, said drive unit comprising:

a circuit housing being attached to said bottom surface of said support plate, said circuit housing being positioned closer to said first foot than said second foot;

a motor housing being attached to said bottom surface of said support plate, said motor housing being spaced from said circuit housing such that each of said circuit housing and said motor housing are positioned on a line extending between said front edge and said back edge of said support plate;

a conduit being coupled between a first lateral wall of said circuit housing and a first lateral wall of said motor housing;

a processor being positioned within said circuit housing, said processor receiving a deliver input, said processor receiving a return input;

a transceiver being positioned within said circuit housing, said transceiver being electrically coupled to said processor, said transceiver being in wireless communication with said personal electronic device such that said transceiver receives operational commands from said control application stored in said personal electronic device, said processor receiving said deliver input when said transceiver receives a deliver command from said control application, said processor receiving said return input when said transceiver receivers a return command from said control application;

a power supply being positioned within said circuit housing, said power supply being electrically coupled to said processor, said power supply comprising at least one battery;

a motor being positioned within said motor housing, said motor rotating in a first direction or a second direction when said motor is turned on, said motor having an output shaft extending through a bottom wall of said motor housing;

a conductor extending through said conduit such that said conductor extends into said circuit housing and said motor housing, said conductor being electrically coupled between said processor and said motor, said motor being turned on to rotate in said first direction when said processor receives said deliver input, said motor being turned on to rotate in said second direction when said processor receives said return input; and a gear having an upper surface being attached to distal end of said output shaft of said motor, said gear having an outer surface comprising a repeating series of depressions which are evenly spaced apart from each other and distributed around a full circumference of said outer surface to define a plurality of teeth extending between said upper surface of said gear and a lower surface of said gear, said teeth on said outer surface enmeshing with said teeth on each of said pair of first rails when said motor rotates in either said first direction or said second direction thereby urging said support plate to travel along said first track and said second track.

* * * * *